Oct. 10, 1967  C. R. STELLJES ETAL  3,345,784
ORBITAL FINISHING SANDER
Filed Dec. 29, 1964  2 Sheets-Sheet 1

INVENTOR.
CHARLES R. STELLJES &
BY  HUGH K. LEACH

D. EMMETT THOMPSON
ATTORNEY.

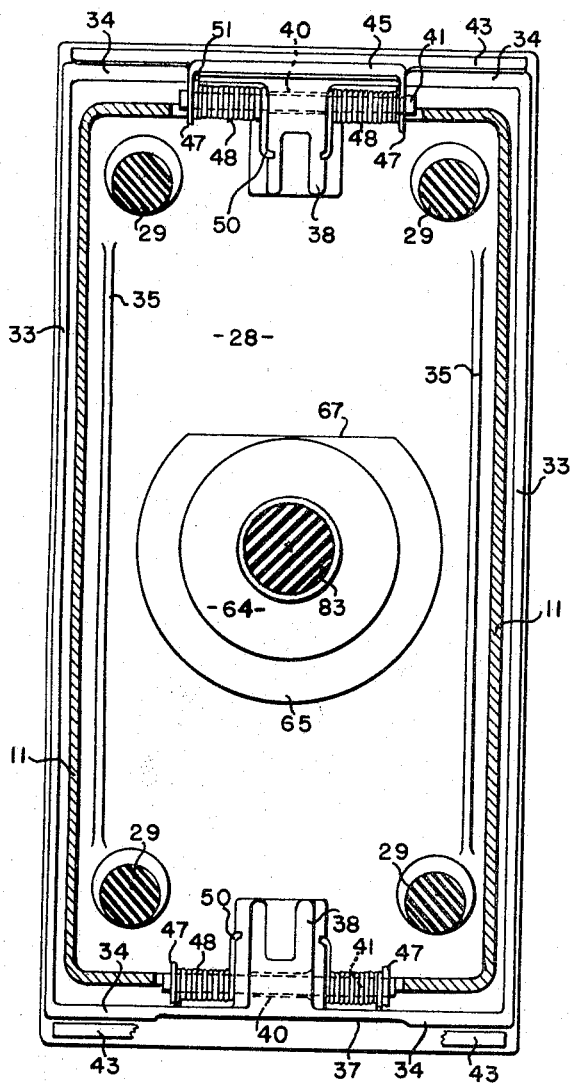
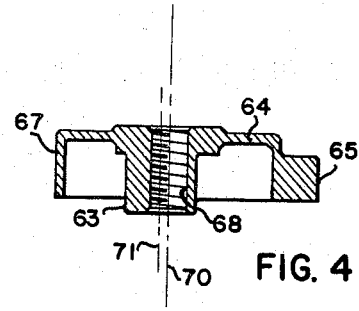
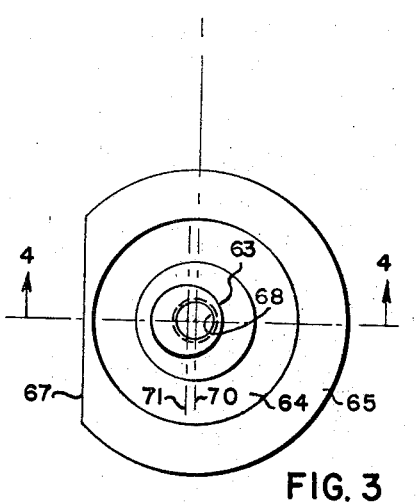

United States Patent Office 3,345,784
Patented Oct. 10, 1967

3,345,784
ORBITAL FINISHING SANDER
Charles R. Stelljes, Fayetteville, and Hugh K. Leach, Syracuse, N.Y., assignors to Rockwell Manufacturing Company, Pittsburgh, Pa., a corporation of Pennsylvania
Filed Dec. 29, 1964, Ser. No. 421,929
4 Claims. (Cl. 51—170)

ABSTRACT OF THE DISCLOSURE

A high speed orbital finishing sander incorporating (1) a hand supported motor including a motor housing having a centered depending motor shaft and also having depending axially elongated, elastomeric mounting posts symmetrically spaced around the shaft axis, (2) a pad assembly comprising a rigid support plate and an upstanding bearing cup axially centered on the upper face of the support plate and mounting a journal bearing carrying an eccentrically mounted weighted rotor member arranged to establish the center of mass of the rotor and the remainder of the pad assembly in offset relation to the axial center of the support plate in a horizontal plane extending approximately medially between the top and bottom ends of the mounting bearing, and (3) an elastomeric drive coupling of greater resistance to lateral displacement than the mounting posts interconnecting the motor rotor shaft and the weighted rotor member. A self counterbalancing cushioned orbital movement of minimal magnitude is imparted to the pad assembly assuring substantially vibration free operation in a fixed horizontal plane.

This invention relates to portable power operated sanding machines having a flat rectangular pad to which a sheet of abrasive material is detachably clamped, the machine including a motor and motion transmitting means for imparting an orbital motion to the pad.

A machine of this general type is disclosed in Patent No. 2,764,852, to A. N. Emmons, Dec. 2, 1956.

Machines of this type are referred to as finishing sanders, and are used extensively for effecting an exceptional smooth finish on a plane surface, such as a table top.

These sanding machines, by their structural arrangement and operation, produce a great deal of vibration, which is objectionable to the operator of the machine, and prevents the machine from being operated adjacent a surface extending perpendicular to the surface being sanded, the vibration causing the pad of the machine to be thrown against and bounced off the perpendicular surface. It is recognized these machines perform more efficiently at high speed, but the vibration becomes more pronounced as the speed is increased.

This invention has as an object an orbital motion finishing sander embodying a structural arrangement which is effective to eliminate vibration in the machine even where the pad is operated at high speed in the order of ten thousand cycles per minute.

The invention consists in the novel features and constructions and the method hereinafter set forth and claimed.

In describing this invention, reference is had to the accompanying drawings in which like characters designate corresponding parts in all the views.

In the drawings:

FIGURE 2 is a view taken on line 2—2, FIGURE 1, with a portion of one of the abrasive sheet clamps broken away.

FIGURE 3 is a bottom plan view of the eccentrically weighted rotor member of the pad assembly.

FIGURE 4 is a view taken on line 4—4, FIGURE 3.

Figure 1:
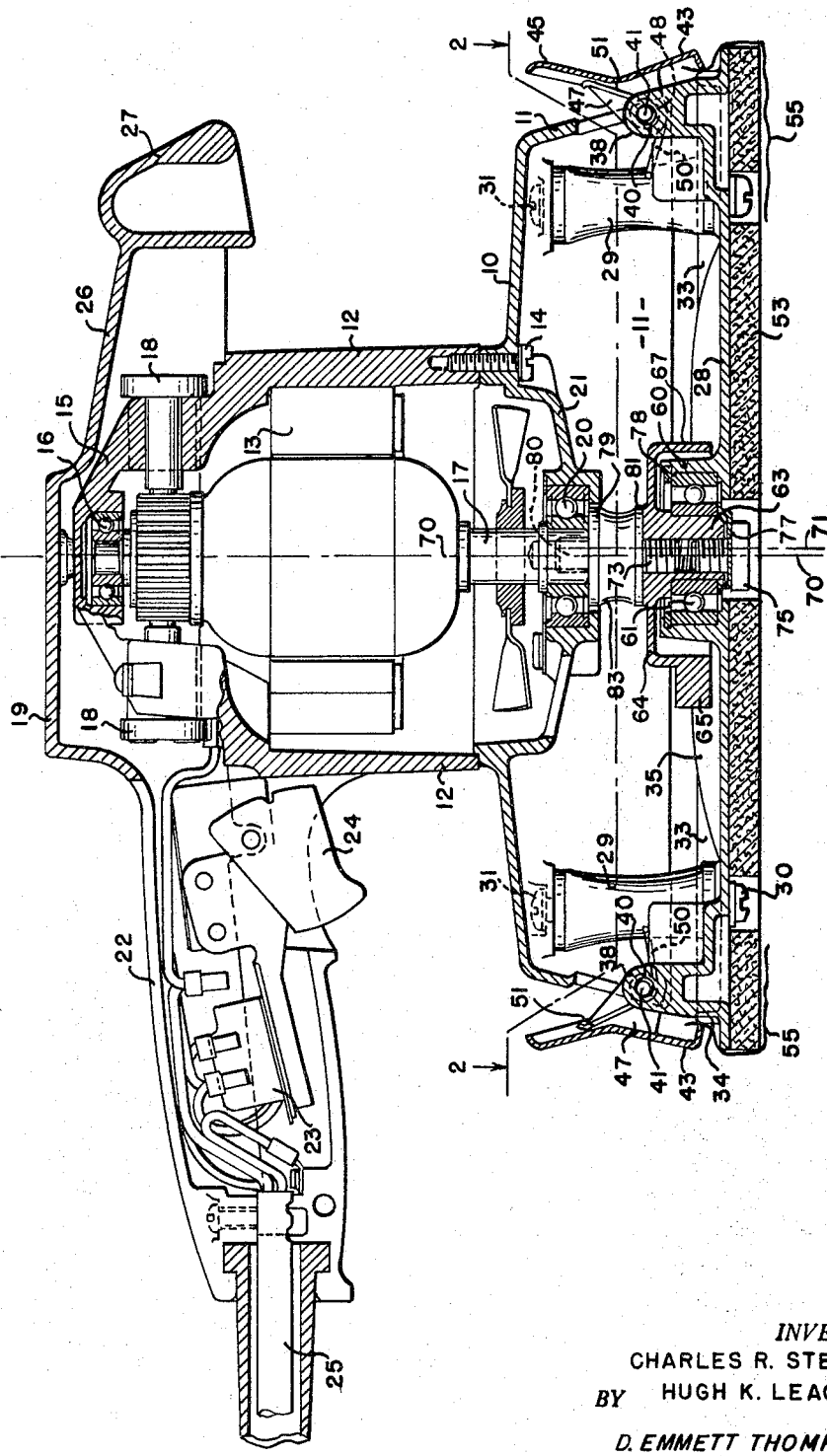
FIGURE 1 is a vertical sectional view taken lengthwise of the machine embodying our invention.

The machine consists generally of a frame having a top wall 10 of substantially rectangular form in plan view, and having depending from the perimeter, a flange 11. A motor housing 12 is mounted on the top wall 10 centrally thereof.

The motor housing 12 is formed with circumferentially spaced thickened portions to provide internal axially extending ribs which are machined to receive the field structure 13 of the motor. One of such thickened portions is shown at the right in FIGURE 1. The lower ends of these thickened portions, or ribs, are tapped to receive screws 14, by which the motor housing is secured to the top wall 10 of the frame. The upper end of the motor housing 12 is formed with an integral bridge structure 15 having a central portion bored to receive a bearing 16, in which the upper end of the armature shaft 17 is journalled. This bridge structure is formed with apertures to receive brush holders 18. The lower end of the armature shaft 17 is journalled in a bearing 20 positioned in a bore formed in the central depressed portion 21 of the top wall 10.

A cap member 19 is attached to the upper end of the motor housing and is formed with a rearwardly extending handle 22 in which there is mounted a switch 23 operated by a trigger 24, for controlling the power to the motor from the power cord 25 entering the rear end of the handle. The cap 19 is also formed with a forwardly extending handle 26 terminating in a knob portion 27. The motor and frame form a stationary mass relative to the pad assembly to be presently described.

A pad assembly is supported from the frame and includes a plate 28 which is fixedly secured to four flexible posts 29 of rubber or like elastomeric material as indicated by the sectioning in FIGURE 2 of generally elongated hour glass configuration, as by screws 30. The upper ends of the posts 29 are fixed to the top wall 10, as by screws 31. The plate 28 is formed at its perimeter with an upstanding continuous flange consisting of ribs 33 extending along the sides of the plate and ribs 34 extending along the ends of the plate and spaced equidistantly inwardly from the end edges thereof. The plate is also formed with ribs 35 of equal length positioned inwardly from the ribs 33, and extending in axial symmetry parallel thereto. The central portions of the ribs 34 are recessed, as at 37, FIGURE 2.

The plate 28 is formed at each end with a laterally centered clamp structure for clamping the ends of an abrasive sheet to the plate 28. This clamping structure may be of various arrangements, as here shown the plate 28 is formed medially of its side edges with an upstanding lug 38. These lugs are formed integrally with ribs 34 and with an aperture 40 to receive a pivot pin 41, on which is mounted an abrading sheet engaging clamp jaw 43, having a length comparable to the width of the rib 34, as shown at the upper end of FIGURE 2. The jaws 43 are formed, intermediate their ends, with an upstanding portion 45, formed at its sides with rearwardly, or inwardly, extending ears 47, spaced laterally equidistantly from the confronting sides of the bosses 38. These ears are apertured to also receive the pivot pins 41. A torsion spring 48 is positioned on the pivot pin 41 intermediate each ear 47, and the confronting side of the boss 38. These springs have a depending end portion 50 engaging inwardly extending flanges of lugs 38 and an upwardly extending end 51 engaging the upwardly extending portion 45 of the clamp, this spring being operable to yieldingly move the jaw 43 inwardly toward the rib 34.

A pad 53 of felt, or like material, is secured to the under side of the plate 28 and is coextensive with the plate underside. The sheet abrasive material 55 is positioned on the pad 53, with the ends of the sheet extending between the jaws 43 and the ribs 34. The jaws 43 are swung outwardly by inward pressure on the portions 45 against the action of the torsion spring 48 to permit insertion of the ends of the abrading sheet between the jaws and the ribs. Release of the portion 45 permits the springs 48 to swing the jaws 43 inwardly clamping the end of the sheet against the rib 33, as shown in FIGURE 1. The abrasive sheet clamping structure per se forms no part of this invention.

An important feature of this invention resides in the drive arrangement for the pad assembly, which is effective, together with the symmetrical structure and mounting posts previously described and the pad assembly connections hereinafter pointed out, to substantially eliminate operational vibration from the machine. To this end, the plate 28 is formed with an upstanding, centered circular flange or cup 60 coaxially bored to snugly receive the outer race of the bearing 61. The posts 29 are secured to the plate 28 symmetrically about the axis of the cup 60. Since the pad structure so far described is symmetrically arranged, the resulting center of mass will lie along the vertical structural center line. At their upper ends, the posts 29 are secured to the frame 10 symmetrically about the axis of the motor shaft 17. The cylindrical hub portion 63 of an eccentrically weighted rotor member is positioned in the inner race of the bearing 61 and has snug engagement therewith.

This rotor member is formed with a discoidal portion 64 integrally associated with the hub portion 63 at the upper end thereof. The discoidal portion 64 merges at its periphery with a thickened depending rim portion 65 which encircles the flange 60 and is spaced outwardly therefrom. A substantial portion of the rim 65 is removed at one side, as indicated by the straight flat surface 67, FIGURES 3 and 4.

The rotor member hub 63 is formed at the axis of the rim 65 with a cylindrical bore 68. This bore is located eccentric with the outer cylindrical surface of the hub 63 which is engaged by the inner race of the bearing 61. In FIGURES 1, 3 and 4, the line 70 indicates the axis of the bore 68, and the line 71 indicates the axis of the eccentric outer cylindrical surface of hub 63. As shown, in FIGURES 3 and 4, the heavy mass of the rotor member is diametrically opposite the throw of the eccentric hub 63.

The inner race of the bearing 61 is fixedly secured to the eccentric hub 63 of the rotor member by a screw 75 threaded into the lower end of the bore 68 with the head of the screw overlying dished washer 77, the peripheral portion of which engages the lower end of the inner bearing race. The hand of the threaded engagement is such, relative to the direction of rotation of the armature shaft 17, that these connections are self-tightening. The outer race of the bearing 61 is secured in the flange 60 by a snap ring 78.

This arrangement provides a particularly compact drive structure having a minimum vertical height, and which is convenient to assemble and dis-assemble. It further provides for the location of the center of the mass of the rotor member and the center of the mass of the pad structure in a common horizontal plane extending normal to and, as viewed in FIGURE 1, slightly to the left of the axis of the motor shaft 17, and this plane extends approximately through the center of the bearing 61—that is, medially between the top and bottom ends of the bearing. This minimizes any cocking effect on the bearing which materially extends the life of the bearing 61 and contributes to a smooth operation of the machine.

The armature shaft 17 is connected to the counterweight through a flexible coupling, which may take the form shown in FIGURE 1, which consists of a disk 79 having a stem 80 threaded into the lower end of the armature shaft 17, and a disk 81 with a stem 73 threaded into the upper end of the bore 68 in the rotor member. These two disks are bonded to an intermediate cylindrical flexible member 83 formed of rubber, or like elastomeric material. The coupling is formed with the stem portions 80, 73, extending in axial alignment.

The intermediate portion 83 of the coupling is of generally hour glass configuration but is of substantially lesser length and greater diameter than posts 29 to impart to it somewhat greater resistance to lateral displacement than the posts 29 supporting the pad assembly. This difference in resistance may be empirically determined using any given motor and housing assembly and pad assembly provided a motor designed to operate at speeds of the order of 10,000 r.p.m. is employed. In this connection, it is well known that a body freely rotating in space will tend to rotate about its center of mass and that, from a standing start until a certain critical speed is exceeded, orbiting of the center of mass around the axis of rotation will occur at an increasing magnitude which will sharply decrease above the critical speed. The use of a motor capable of operating at speeds well above this critical speed together with the yielding coupling and the yielding mounting posts permits the pad assembly to simulate in operaiton a free body in space. Control of the magnitude of the orbiting is effected by the higher resistant coupling until the critical speed is exceeded and at the same time, through the lesser resistance of the mounting posts, much of the vibrational shock force resulting from the permitted orbiting of the pad assembly is absorbed. Once the critical speed is substantially exceeded, the magnitude of the orbiting tendency of the pad assembly around the center of rotation becomes of negligible significance since it is fully absorbed by the flexible coupling 83 and flexing of posts 29 around their respective centered connection to top wall 10 of the rectangular frame as shown by the offset of the opposite post ends as seen in FIGURE 1. The flexible portion 83 of the coupling will permit the rotor member and pad assembly to orbit about the axis of the motor shaft. In operation under this condition, the intermediate portion 83 of the coupling will absorb any lateral forces and prevent the same from being transmitted to the motor shaft.

Accordingly, with our arrangement the machine will operate, upon reaching its designed ten thousand cycles per minute or higher, without any noticeable vibration being imparted to the frame of the machine, and permitting the various components of the machine to be manufactured with acceptable commercial tolerances.

What we claim is:

1. A portable orbital motion finishing sander comprising a frame, a motor fixedly mounted in centered relation on said frame with its output shaft protruding from one face of said frame and forming with said frame a stationary mass of determinable value; a pad assembly connected to said frame at points symmetrically related to the output shaft axis by flexible connectors to form a movable mass of determinable value adapted to be orbitally driven by said output shaft; and a flexible drive connection interconnecting said output shaft and said pad assembly characterized by an elastomeric intermediate member having its opposite ends directly fixedly connected to the said output shaft and to an eccentrically weighted rotor member carried by a journal bearing mounted in coaxially fixed relation to the center of said pad assembly, the center of mass of said pad assembly being located in a plane normal to the axis and midway between the ends of said bearing, said motor having an operating speed to assure an operation speed of said rotor member is excess of the critical vibration speed of the orbiting pad assembly.

2. The sander of claim 1 wherein the flexible connectors for said pad assembly comprise elongated elastomeric posts of generally hour glass configuration and said elastomeric intermediate member is of generally hour glass configuration and of lesser length and greater diameter than said posts.

3. The sander of claim 1 wherein said elastomeric intermediate member has a greater resistance to lateral displacement than said flexible connectors.

4. The sanders of claim 1 wherein the opposite ends of said elastomeric intermediate member are bonded to respective disk-like members having integrally formed, coaxially arranged stems threaded to be respectively threaded into a coaxial threaded bore in said output shaft and said eccentric bore in said rotor member.

References Cited

UNITED STATES PATENTS

| | | | |
|---|---|---|---|
| 2,270,309 | 1/1942 | Kehle | 51—170 |
| 2,367,668 | 1/1945 | Champayne | 51—170 |
| 2,614,369 | 10/1952 | Robins | 51—170 |
| 2,722,789 | 11/1955 | Robins | 51—170 |
| 2,775,076 | 12/1956 | Rodds | 51—170 |
| 2,830,411 | 4/1958 | Hartmann | 51—170 |
| 2,929,177 | 3/1960 | Sheps | 51—170 X |
| 3,199,251 | 8/1965 | Enders | 51—170 |

LESTER M. SWINGLE, *Primary Examiner.*